United States Patent [19]
Kharas

[11] Patent Number: 5,908,806
[45] Date of Patent: Jun. 1, 1999

[54] COPPER-SILVER ZEOLITE CATALYSTS

[75] Inventor: Karl C. C. Kharas, Tulsa, Okla.

[73] Assignee: ASEC Manufacturing

[21] Appl. No.: 08/857,640

[22] Filed: May 16, 1997

Related U.S. Application Data

[63] Continuation of application No. 08/653,836, May 28, 1996, which is a continuation-in-part of application No. 08/477,225, Jun. 7, 1995, abandoned.

[51] Int. Cl.[6] ........................................... B01J 29/06
[52] U.S. Cl. ................................. 502/64; 502/71; 502/77
[58] Field of Search .................................. 502/64, 71, 77

[56] References Cited

U.S. PATENT DOCUMENTS

| | | | |
|---|---|---|---|
| 5,219,545 | 6/1993 | Kagawa et al. | 423/239.2 |
| 5,407,651 | 4/1995 | Kawai | 423/213.2 |

*Primary Examiner*—Michael Lewis
*Assistant Examiner*—Thomas G. Dunn, Jr.
*Attorney, Agent, or Firm*—Kuffner & Associates

[57] ABSTRACT

A catalyst for the removal of carbon monoxide, hydrocarbons and nitrogen oxides in an exhaust gas made by a process comprising:

a) preparing a suspension comprising a liquid, a zeolite, a weak base, and salts of copper and silver,
said zeolite being crystalline and having a Si/Al atomic ratio between about 5 and about 100, a pore size between about 0.5 nm and about 1.3 nm, essentially no octahedral aluminum detectable by $^{27}$Al NMR spectroscopy and a sodium ion exchange capacity, with regard to total aluminum content, greater than 75%, and wherein said suspension contains sufficient amounts of said copper and silver salts to result in a copper content in said catalyst, when finished, between about 0.5 wt. % and about 12 wt. % and a silver content between about 0.25 wt. % and about 20 wt. %;

b) adding a sufficient amount of a strong base to raise the pH of the suspension to between about 7 and about 9, thereby creating a metal-containing zeolite support in said suspension;

c) separating the support from said liquid;

d) dispersing said support on a substrate; and e) drying and calcining the product of step (d).

14 Claims, 7 Drawing Sheets

COPPER-SILVER ZEOLITE CATALYSTS

This application is a continuation of application Ser. No. 08/653,836, filed May 28, 1996, which is a continuation-in-part of application Ser. No. 08/477,225, filed Jun. 7, 1995, now abandoned.

BACKGROUND OF THE INVENTION

This invention relates to a process for removing carbon monoxide, hydrocarbons, and nitrogen oxides in oxidizing gas streams such as may be encountered in exhaust from advanced lean-burn automotive engines or diesel engines.

Three-way catalysts (catalysts which simultaneously oxidize carbon monoxide and hydrocarbons while reducing oxides of nitrogen ($NO_x$) and oxygen) are widely used to purify toxic emissions of automotive internal combustion engines. These catalysts typically contain precious metals, such as platinum, palladium, or rhodium, together with promoters such as ceria supported on alumina. The catalysts function by using carbon monoxide, hydrogen, and hydrocarbons to reduce $NO_x$ when the amount of oxygen and of $NO_x$ present are sufficient but not in significant excess of the amount required to oxidize completely the carbon monoxide, hydrogen, and hydrocarbons in the exhaust gas. Therefore, engines are controlled to operate so that a sufficient but not excessive amount of air is allowed to react with the fuel.

With respect to fuel consumption, it is more economical to operate automobiles powered by internal combustion engines under lean conditions, i.e., with oxygen present in excess of that required to react completely with the fuel during combustion. Unfortunately, the emissions of these so-called lean-burn engines also contain excess oxygen that is substantially in excess of the amount required to completely oxidize carbon monoxide and hydrocarbons coexisting in the emission stream. Therefore, conventional three-way catalysts do not adequately reduce $NO_x$ in lean gas streams.

Clearly, methods are needed to promote the reduction of $NO_x$ produced in lean-burn engines. Considerable work has been done recently using alumino-silicate zeolites containing copper. But catalysts which contain copper as the only effective component show inferior performance. Their reduction of $NO_x$ increases rapidly with temperature, passes through a maximum, and then declines.

Copper zeolite catalysts that also contain silver are known, but for the decomposition rather than for the reduction of $NO_x$. (e.g., Kagawa et al. *Chemistry Letters*, The Chemical Society of Japan, 407–410 (1991), and Austral. Pat. Appl. 722699 (Kagawa et al.)). The decomposition of $NO_x$, however, is severely inhibited by oxygen and $H_2O$, and made substantially impossible by sulfur dioxide, all of which are normal constituents in automotive exhaust. Moreover, the conversion of $NO_x$ has not been demonstrated in such systems when the inlet concentrations of $NO_x$ are below about 1500 ppm, as is the case in automotive exhaust.

SUMMARY OF THE INVENTION

It is a feature of the present invention to provide a process for the removal of carbon monoxide, hydrocarbons, and nitrogen oxides in an oxidizing exhaust gas, such as automotive exhaust from an engine operating under lean burning conditions. The process of the present invention comprises contacting the exhaust gas with a catalyst comprising a crystalline alumino-silicate zeolite loaded with copper and silver supported on a substrate. The present invention is particularly useful when the exhaust gas contains either no or little water or a concentration of hydrocarbon such that the ratio of $C/NO_x$ is greater than about 4.5.

The crystalline zeolites useful in the present invention are specifically characterized in that they possess no octahedral aluminum detectable by $^{27}Al$ NMR spectroscopy and possess ion exchange capacities greater than 75% with regard to total aluminum content. As generally accepted among those skilled in the art, the absence of octahedral aluminum means that the zeolite has not been subjected to de-alumination. They should also have a Si/Al atomic ratio between 5 and 100, and a pore size in the range of from about 0.5 to about 1.3 nm (5–13 Å).

The copper content of the catalyst of this invention will be in the range of from about 0.5 wt. % to about 12 wt. %, and the silver content will be in the range of from about 0.25 wt. % to about 20 wt. %. The atomic ratio of copper to silver in the finished catalyst is preferably greater than 1 and the atomic ratio of silver to aluminum is less than 1. The atomic ratio of copper to aluminum is greater than 0.5. The catalyst may also contain an optional binder to promote adhesion of the zeolite to the substrate. The preferred binder is selected from the group consisting of alumina, silica-alumina, zirconia, titania and silica. Subject to the foregoing requirements concerning essential lack of octahedral aluminum, ion exchange capacity and pore size, suitable zeolites are those from the group consisting of ZSM-5, ZSM-11, ZSM-12, ZSM-20, ZSM-22, ZSM-35, ferrierite, mordenite, hexagonal faujasite, or zeolite beta.

DESCRIPTION OF THE INVENTION

I have discovered that the effectiveness of copper incorporated into silico-aluminate zeolites for reduction of $NO_x$ in oxidizing gas streams is enhanced through an adequate co-incorporation of silver. This enhancement is most evident in oxidizing gas streams that contain sufficient hydrocarbon that the ratio of C/NO is greater than about 4.5. The enhancement can also be demonstrated in oxidizing gas streams with a lower C/NO ratio provided that the gas stream contains sufficient hydrocarbon to effect $NO_x$ reduction and substantially no water, that is, less than about 0.5% by volume. Adequate co-incorporation of silver with copper increases the temperature range where $NO_x$ reduction attains a high, nearly constant value, thereby increasing the total amount of $NO_x$ reduced during a temperature rise.

The zeolites used in the oxidizing exhaust gas catalysts and methods of this invention are crystalline zeolites having no octahedral aluminum detectable by $^{27}$Al NMR spectroscopy; possessing ion exchange capacities greater than 75% with regard to total aluminum content; having a Si/Al atomic ratio between 5 and 100; and having pore sizes in the range of from about 0.5 to about 1.3 nm (5–13 Å). It is widely-known to those skilled in the art (see, for instance, Klinowski et al., *Nature*, vol. 296, pages 533–536, 1982 and Brunner et al., *Zeolites*, vol. 9, pages 282–286, 1989) that the presence of octahedral aluminum in a zeolite indicates that dealumination has occurred. These zeolites are described by Rosemarie Szostak in *Handbook of Molecular Sieves*, Van Nostrand Reinhold, New York, 1992. Preferably, the zeolite is selected from the group consisting of ZSM-5, ZSM-11, ZSM-12, ZSM-22, ZSM-35, ferrierite, or zeolite beta. The catalyst may also comprise an optional binder, chosen from the group consisting of alumina, silica-alumina, titania, or zirconia, which will act to improve adhesion of the zeolite to ceramic monoliths and other flow through carrier substrates.

The zeolite can be deposited on a substrate that is in pelleted form. More preferably, the zeolite is deposited by methods known to those skilled in the art on an inert carrier substrate such as a honeycomb monolith made of ceramic or metal.

The zeolite-coated substrate is then treated with copper and silver to achieve a total copper content in the range of from about 0.5 to about 12 wt. %, preferably from about 4 wt. % to about 8 wt. %, and a total silver content in the range of from about 0.25 wt. % to about 20 wt. %, preferably from about 2 wt. % to about 8 wt. %. The atomic ratio of copper to silver (Cu/Ag) in the finished catalyst should always be greater than 1, preferably greater than 1.5, and most preferably between 2 and 4. The atomic ratio of silver to aluminum (Ag/Al) will be less than 1.0. The atomic ratio of copper to aluminum (Cu/Al) is preferably greater than 0.75.

All else being equal, co-incorporation of silver with copper into siliceous zeolites appears to generally increase the catalytic $NO_x$ reduction performance over a catalyst having the same components, but without silver. The effect is most noticeable in gas streams containing sufficient HC to establish a $C/NO_x$ ratio greater than about 4.5. In the absence of silver, Cu-zeolite catalysts show maximum $NO_x$ reduction performance when the copper/aluminum atom ratio (Cu/Al) is between about 0.75 and 1.25. When the ratio is lower than 0.75, considerably less $NO_x$ reduction occurs and where the ratio is higher than 1.25, no added benefit due to the additional copper is observed and, in many cases, $NO_x$ reduction gradually declines as the ratio is increased. But when appropriate amounts of silver are effectively present, a Cu/Al ratio greater than 1.25 results in a catalyst with performance better than a catalyst with a Cu/Al ratio of between 0.75 and 1.25.

The catalyst compositions of this invention may be made by methods known to those skilled in the art. One preferred preparative method involves first incorporating the copper and silver into the zeolite, washcoating the metal-containing zeolite support onto a monolithic substrate, and calcining to obtain the catalyst. Another preferred method involves incorporating the metals by using soluble salts of copper and silver together with a weak base, followed by addition of a strong base to raise the pH to 7–9, and subsequently evaporating the solvent, filtering and calcining to obtain the catalyst. In an especially preferred method, colloidal suspensions of cupric acetate and silver nitrate are used to accomplish the incorporation of copper and silver into the zeolite.

Suitable sources of copper and silver are the soluble salts such as nitrate, acetate, and similar other carboxylates. Preferred sources are copper acetate, copper nitrate, and silver nitrate. When copper acetate is not used, a soluble acetate or carbonate, such as the ammonium salt, is required to assure formation of silver colloid. In all cases, it is necessary to decrease the solubility of silver ion through the use of a weak base such as carbonate or acetate. The formation of silver acetate or silver carbonate colloids appears to be critical in the production of a superior catalyst for selective reduction of $NO_x$ by hydrocarbons. Examples of strong bases are aqueous ammonia, and tetraethylammonium hydroxide and other tetraalkylammonium hydroxide compounds. Examples of weak bases are ammonium acetate, ammonium carbonate, ammonium bicarbonate, ammonium oxalate, tetraethylammonium acetate, tetraethylammonium carbonate, tetraethylammonium oxalate, and other tetraalkylammonium acetate, carbonate, and oxalate compounds.

The examples below will show that synergy between copper and silver results in improved $NO_x$ reduction performance in the methods of this invention. Performance advantages provided by this synergy cannot be duplicated simply by increasing the amount of copper present in the catalyst.

EXAMPLE I

Copper-only and copper-silver zeolite catalysts A through I and a control Catalyst J were prepared by the following method except where noted in Table I: Metal salts were dissolved into 1 liter deionized water and a ZSM-5 material provided by Conteka (CBV 5020, ID No 130-90-002, Si/Al atom ratio 25.5) was added. After stirring overnight, the pH was raised to 7.50 generally using aqueous ammonia except as noted in Table 1 and held there for two hours. After filtering, drying, and calcination at 400° C. for about 4 hours, the catalyst was divided into granules between 420μ and 850μ in size using wire screens. The copper and silver ion exchange contents and copper and silver ratios to aluminum atoms are listed in Table I. Control Catalyst J was ZSM-5 material with no metal added, suspended in deionized water, filtered, and dried.

Comparative Catalyst X was prepared according to the procedure outlined in Example 16 of Australian Patent Application No. Au-72699/91 (assigned to Tosoh Corp., "Tosoh"). One liter of 0.0120 molar aqueous silver nitrate was prepared by dissolving 2.04 grams silver nitrate in 1 liter of deionized water. The solution was shielded from light and 10.3 g ZSM-5 provided by Conteka (CBV 5020, ID No 130-90-002, Si/Al atom ratio 25.5) was added to the solution. The mixture was maintained, with stirring, for one day at 60° C. A small sample of the solid material was removed for analysis; analysis reveals the Ag/Al mole ratio in the intermediate material to be 0.40. The rest was suspended in one liter of an 0.012 molar (0.024N) aqueous solution of copper acetate. This suspension was shielded from light and maintained, with stirring, for one day at 60° C. The catalyst was then recovered by filtration, washed, and dried. Analysis revealed the cupric ion exchange level to be 89% and the silver ion exchange level to be 6%. The Cu/Al mole ratio was 0.44 while the Ag/Al mole ratio was 0.06. Evidently, cupric ion displaced silver ion from ion exchange sites in the ZSM-5.

Table I shows the amount of zeolite and metal salts used to prepare each catalyst, the percentage of Cu and Ag ion exchanged, and the Cu/Al and Ag/Al atomic ratio each catalyst.

TABLE I

| Catalyst | ZSM-5 (g) | Cupric acetate hydr. (g.) | Silver nitrate (g) | Cu ion exch. (%) | Ag ion exch. (%) | Cu/Al | Ag/Al | Amounts of $NO_x$ reduced relative to Catalyst A (%) |
|---|---|---|---|---|---|---|---|---|
| A | 20.0 | 5.02 | — | 433 | — | 2.16 | — | 100 |
| B | 10.0 | 1.88 | — | 332 | — | 1.66 | — | 105 |
| C | 10.0 | 1.27 | — | 227 | — | 1.14 | — | 104 |
| D[1] | 20.0 | 5.02 | — | 87 | — | 0.43 | — | 83 |
| E | 20.0 | 2.49 | 4.25 | 259 | 89 | 1.30 | 0.89 | 115 |
| F | 20.0 | 3.32 | 2.83 | 348 | 82 | 1.74 | 0.82 | 122 |
| G[2] | 20.0 | 2.49 | 1.10 | 218 | 46 | 1.09 | 0.46 | 124 |
| H[2] | 20.0 | 4.25 | 1.10 | 219 | 114 | 1.10 | 1.14 | 71 |
| I | 20.0 | — | 8.48 | — | 221 | — | 2.21 | 20 |
| Control J | 15.0 | — | — | — | — | — | — | 11 |
| S | 20.0 | 3.99 | 1.70 | 412 | 78 | 2.06 | 0.78 | 121 |
| Comp. X | 10.3 | 2.41 | 2.04 | 89 | 6 | 0.44 | 0.06 | 89 |

[1] No aqueous ammonia treatment to raise pH.
[2] pH was raised with a solution of $[N(C_2H_5)_4^+][OH^-]$.

Figure 1:
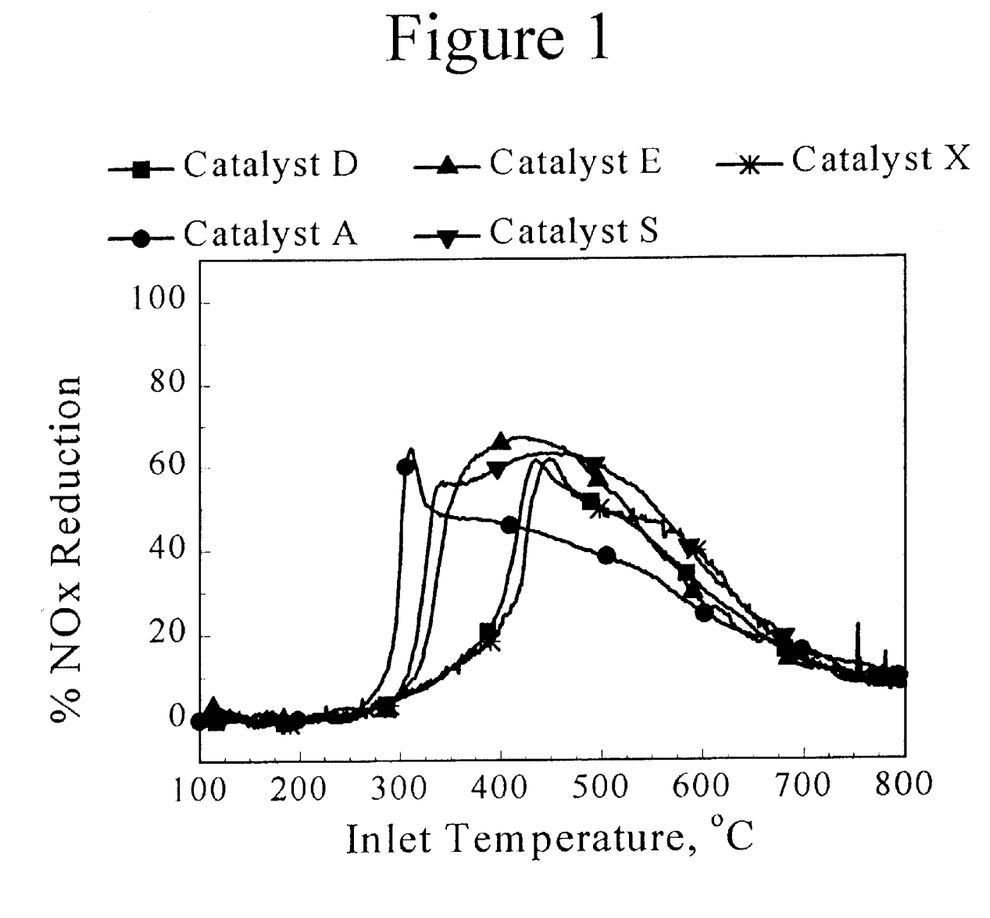
FIGS. 1 and 2 compare the $NO_x$ reduction capabilities of copper-only zeolite catalysts with selected copper-silver zeolite catalysts made according to the present invention.

Activity Testing. The activity of the inventive, control, and comparative catalysts was measured in a testing reactor as follows: One gram of catalyst was loaded into a tubular flow reactor and exposed to a gas mixture containing 3000 ppmv CO, 1000 ppmv $H_2$, 1600 ppmv propene, 1200 ppmv $NO_x$, 3.2 volume % $O_2$, 10 volume % $CO_2$, 10 volume % steam, and balance $N_2$. This corresponds to an air to fuel ratio of about 18. The equivalence ratio (oxidants/reductants) was 3.54. Testing involved heating the catalyst at 5° C. per minute to 800° C. with a volumetric flow rate of 5 liters/minute. $NO_x$ reduction performance versus temperature for selected catalysts of Example I is shown in FIG. 1.

Overall $NO_x$ reduction performance can be evaluated by integrating $NO_x$ conversion over the time involved in the temperature rise. Use of time, rather than temperature, as the independent variable in the integration eliminates any possible complication due to exotherms associated with burning the CO, $H_2$, and propene. The integrated $NO_x$ reduction vs. temperature for Catalyst A (433% Cu) is arbitrarily defined as 100; values for other catalysts are calculated analogously. Higher values correspond to proportionately greater amounts of $NO_x$ reduced during the temperature rise. Obviously, it is desirable to maximize this integrated value. Relative amounts of $NO_x$ reduced are listed in Table I.

The results of Table I show Catalysts I (221% Ag) and J (no silver or copper) to be very poor catalysts for $NO_x$ reduction. Catalysts containing copper alone as the active component have moderate performance.

It is known that the optimal amount of copper in ZSM-5 catalysts containing copper as the only active component for selective catalytic reduction of $NO_x$ is about 200% of the cupric ion exchange level. This is the equivalent of a Cu/Al atom ratio of about one. Copper-only catalysts containing less copper have poorer performance while those catalysts containing more copper do not have improved performance commensurate with their increased copper content. In this regard, the catalysts of the present invention, containing both copper and silver as the active component, are superior to catalysts containing only copper as the active component. In the catalysts of this invention the benefit of increasing copper content continues to accrue. Thus, Catalyst F (348% Cu, 82% Ag) unexpectedly has better $NO_x$ reduction performance than Catalyst E (259% Cu, 89% Ag), although Catalyst E is a better catalyst than either Catalyst B (332% Cu) or Catalyst C (227% Cu). Catalyst S (412% Cu, 78% Ag) shows roughly equivalent performance to Catalyst F suggesting that $NO_x$ performance benefits of further increasing Cu concentrations beyond 412% will not continue to accrue at this silver concentration.

The successful $NO_x$ reduction ability of Catalyst G (218% Cu, 46% Ag), which was prepared by raising the pH with a solution of $[N(C_2H_5)_4^+][OH^-]$, shows that hydroxides such as tetraethylammonium hydroxide may be substituted for concentrated aqueous ammonia in the catalyst preparation step. Both compounds allow for incorporation of copper in substantial excess of the theoretical limit of cupric ions.

The performance of Catalyst H (219% Cu, 114% Ag, Ag/Al=1.14) shows that Ag/Al mole ratios greater than 1 are detrimental.

The sequential method of silver and copper incorporation taught by Australian Patent Application No. Au-72699/91 (assigned to Tosoh Corp., "Tosoh") and Kagawa et al., "Cocation Effect in Catalytic Property of Copper Ion-Exchanged ZSM-5 Zeolites for the Direct Decomposition of Nitrogen Monoxide", *Chemistry Letters*, pp. 407–410, 1991 ("Kagawa"), produces a catalyst that is inferior for selective reduction of $NO_x$ by propene. Example Catalyst X shows a Cu, Ag-ZSM-5-89,6 catalyst prepared according to the detailed method of Tosoh, where silver is exchanged prior to copper just as is recommended by Kagawa, using the same commercial ZSM-5 we use in our other examples, produces a catalyst substantially inferior for selective reduction of $NO_x$ by propene.

Referring again to Table I, it should be noted that neither Catalyst I (221% Ag) nor J (no silver or copper) shows appreciable $NO_x$ reduction performance under the stated oxidizing conditions. On the other hand, while it is known that the addition of Cu does enhance $NO_x$ reduction, we have shown that copper and silver containing formulations maintain higher degrees of $NO_x$ reduction over a broad temperature range when compared to Cu-ZSM-5 catalysts, in general. Catalyst F (348% Cu, 82% Ag) contains nearly the same number of exchange equivalents as Catalyst A (433% Cu). However, it performs substantially better at $NO_x$ reduction. The advantage of a Cu-Ag formulation appears to be due to some synergy between Cu and Ag rather than a different number of exchange equivalents present. The atomic ratio of transition metal atoms to aluminum atoms in Catalyst E (259% Cu, 89% Ag) was 2.18. The atomic ratio of transition metal atoms to aluminum atoms in Catalyst A (433% Cu) was 2.16. The advantage of Catalyst E over Catalyst A appears to be due to synergy between Cu and Ag rather than to the overall ratio of transition metal atoms to aluminum atoms in the catalyst.

EXAMPLE II

Copper-only and inventive copper-silver zeolite catalysts were made using zeolite Beta by the following method (except where noted in Table II): Twenty grams of zeolite Beta (Valfor CP811BL-25, lot #HB-8, PQ Corp., Si/Al atom ratio=10.8) were suspended in one liter deionized water containing a specified amount of dissolved cupric acetate hydrate. After stirring overnight, the pH of the solution was raised to 7.5 using aqueous ammonia solution and held at that pH for two hours. After filtering and calcination in air at 400° C. for 4 hours, the resultant catalyst was divided into granules between 420µ and 850µ in size using wire screens.

Table II shows the amount of zeolite and metal salts used to prepare each catalyst, the percentage of Cu and Ag ion exchange, and the Cu/Al and Ag/Al atomic ratios for each catalyst.

TABLE II

| Catalyst | Cupric acetate hydr. (g) | Silver nitrate (g) | Cu ion exch. (%) | Ag ion exch. (%) | Cu/Al | Ag/Al | Amounts of $NO_x$ reduced relative to Catalyst A (%) |
|---|---|---|---|---|---|---|---|
| K | 4.21 | — | 159 | — | 0.79 | — | 108 |
| L | 4.21 | 3.59 | 159 | 46 | 0.79 | 0.46 | 143 |
| M | 5.10[1] | 3.50 | 133 | -nd- | 0.67 | — | 113 |
| N | 5.10[2] | 3.50 | 170 | 44 | 0.85 | 0.44 | 164 |
| O | 5.10 | 3.50 | 167 | 45 | 0.83 | 0.45 | 157 |
| P | 5.10 | 3.50 | 159 | 46 | 0.80 | 0.46 | 155 |

Figure 2:
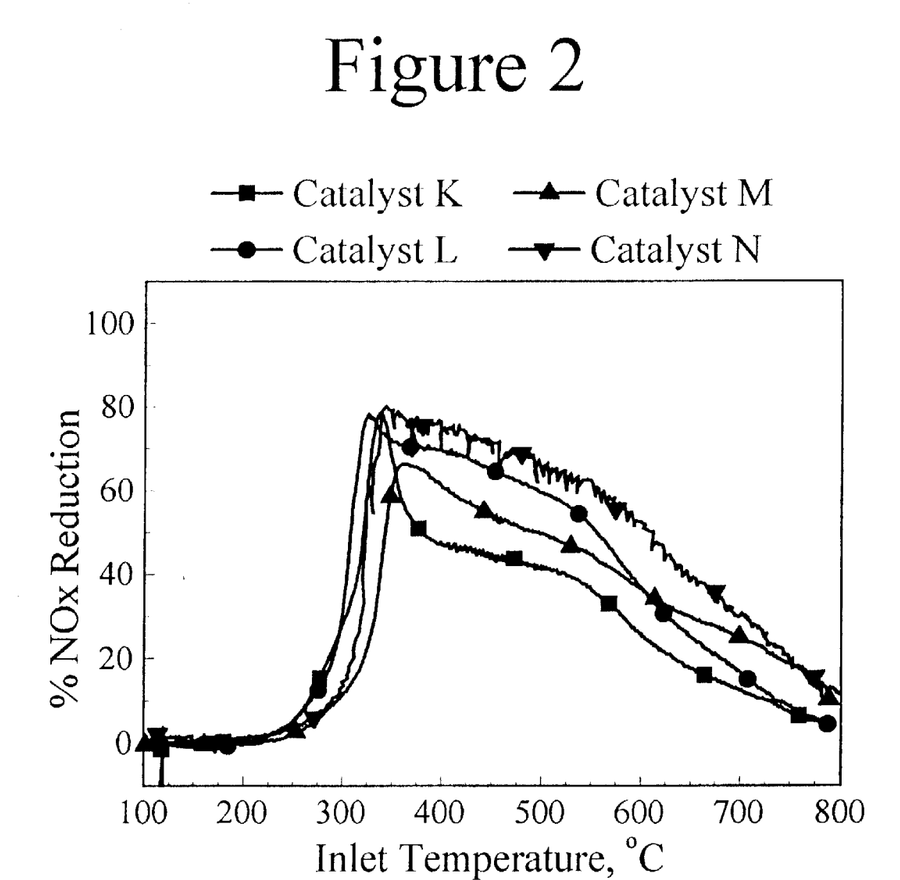

[1]Cupric nitrate used instead of cupric acetate.
[2]Ammonium carbonate (5 g in 100 mL deionized water) added to Cu/Ag. solution before zeolite added. pH was raised to 6.8 after stirring overnight.
nd = not detectable Activity Testing. The activities of the six catalysts prepared with zeolite Beta (Catalysts K, L, M, N, O and P) were measured in a testing reactor according to the method of Example I. The relative integrated $NO_x$ reduction value for every catalyst of this example, determined according to the method of Example I is listed in Table II. Plots of the $NO_x$ reduction activity as the temperature increased for four of the catalysts (catalysts K, L, M and N) are shown in FIG. 2. With reference to FIG. 2, it can be seen that $NO_x$ reduction reached moderately high values (at around 300° C.) for all four catalysts. $NO_x$ reduction over the copper-only Catalyst K (159% Cu) catalyst declined considerably at higher temperature. The $NO_x$ reduction performance of Catalyst L (159% Cu, 46% Ag) did not decrease markedly as temperature was increased. The clear benefit of the addition of silver to the copper catalyst is shown by the increased amounts of $NO_x$ reduction at relatively high temperatures for Catalyst L.

Catalyst M (133% Cu, 0% Ag) shows performance similar to that of Catalyst K (159% Cu). This is reasonable since no silver was incorporated into either catalyst in this all-nitrate preparation. Compared to Catalyst L (159% Cu, 46% Ag), both the composition and the performance of Catalyst M shows that the acetate anions in cupric acetate are sufficient to produce a superior catalyst but all-nitrate preparations are inadequate. Simultaneous ion exchange of copper and silver is also inadequate to provide a superior catalyst. In Example I, we showed that sequential exchange is inferior to our co-incorporation of copper and silver while in this example, we show that simultaneous ion exchange is inadequate.

In control experiments, we observe mixtures of cupric acetate and silver nitrate form white silver colloidal suspensions while all-nitrate mixtures form no colloid. This may be due to the presence of sparingly soluble silver acetate. Preparations where colloid formation does not occur result in inferior catalysts. The final three catalysts of this example, specifically, Catalyst N (170% Cu, 44% Ag), Catalyst O (167% Cu, 45% Ag) and Catalyst P (159% Cu, 46% Ag), were made from silver nitrate and cupric nitrate and either ammonium carbonate or ammonium acetate. The catalyst made with ammonium acetate shows that the source of acetate ion is not critical—both cupric acetate and ammonium acetate are sufficient. Like the acetate, carbonate ions can also cause formation of colloids with silver. The two catalysts made with ammonium carbonate show the sufficiency of this ligand for producing superior catalysts and, further, show that the order of addition of materials is not critical in making superior catalysts, so long as cupric cations, silver cations, and silver colloid-forming anions coexist in the preparative solution.

We now demonstrate that these catalysts convert $NO_x$ by selective reduction with propene rather than by selective reduction with CO or $H_2$ or by simple decomposition to the elements. This result is important since, as will be apparent, conditions wherein the catalyst can be used effectively to reduce $NO_x$ emissions are limited. In this experiment, the Catalyst P (159% Cu, 46% Ag) was exposed to the same gas mixture used in Example I that models the emissions due to a gas mixture with an air/fuel ratio of 18. The temperature was increased to 450° C. using the same procedure as in Example I but was then stopped at 450° C. The temperature was held constant at that point for over thirty minutes; during this time, the inlet $NO_x$, $O_2$, $CO_2$, and $H_2O$ concentrations were also held constant. The concentrations of CO, $H_2$, and propene were then varied such that the total number of chemical reducing equivalents was held constant. For the first five minutes, the propene (HC) concentration was 1600 ppmv, the CO 3000 ppmv, and the $H_2$ 1000 ppmv. Then the propene concentration was increased to 1900 ppmv, the CO decreased to 1000 ppmv, and the $H_2$ decreased to 333 ppmv. Next, the propene concentration was decreased to 710 ppmv, the CO increased to 9000 ppmv, the $H_2$ to 3000 ppmv. Then the propene was increased to 1933 ppmv, the CO decreased to 750 ppmv, the $H_2$ to 250 ppmv. Finally, the propene was decreased to 267 ppmv, the CO increased to 12000 ppmv, the $H_2$ to 4000 ppmv. The gases were returned to their initial concentrations. The results of this experiment are graphically illustrated in FIG. 3.

Figure 3:
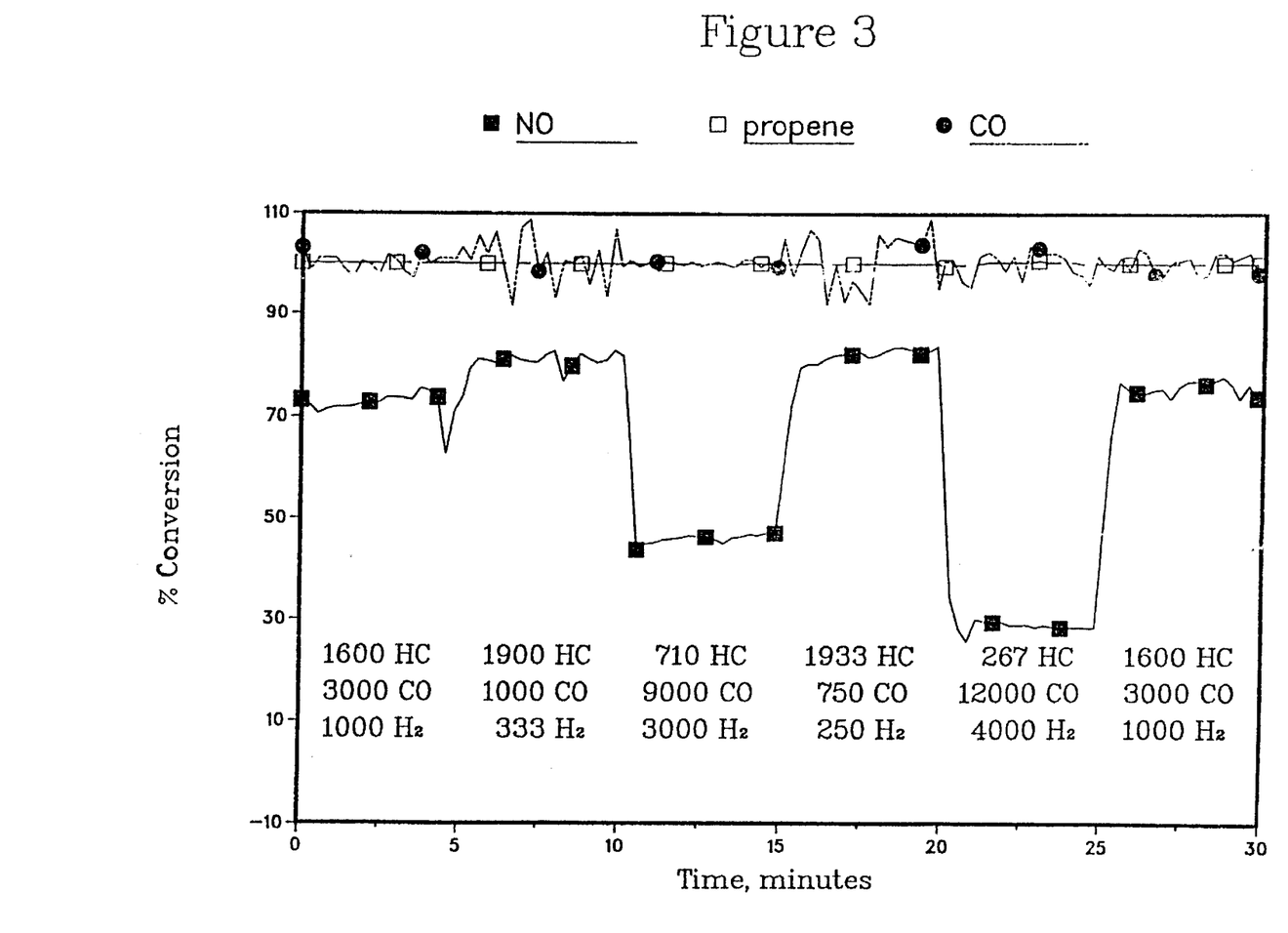
FIG. 3 is a plot of the results of an experiment showing how $NO_x$ conversion at constant temperature changes with changes in the propene concentration of emissions contacting the catalyst of the instant invention.

As will be seen by reference to FIG. 3, throughout this time period, CO and propene conversions of essentially 100% were maintained. The $NO_x$ conversion at the end of this episode was the same as at the beginning of the episode, thus demonstrating stable catalyst performance. The higher the propene inlet concentration, the higher the amount of $NO_x$ conversion. The lower the propene inlet concentration, the lower the amount of $NO_x$ conversion. $NO_x$ conversion should be independent of these gas concentrations if $NO_x$ is converted by simple decomposition to the elements. This is not observed. Rather, $NO_x$ conversion correlates well with propene inlet concentrations. This is consistent with $NO_x$ reduction by a selective reaction with propene.

It is now well known that Cu-ZSM-5 catalysts can also reduce $NO_x$ by selective reduction with hydrocarbons in addition to by simple decomposition. Practical use of these catalysts will require sufficient amounts of hydrocarbon as reducing agents. Simple application of these catalysts to Diesel engine exhaust will not be straightforward since Diesel exhaust contains low amounts of hydrocarbons. Practical implementation may require injection of fuel into the exhaust stream in order to provide sufficient amounts of reducing agent. Such would not be the case if these catalysts truly functioned as $NO_x$ decomposition catalysts under practically encountered conditions.

In both absolute and relative terms, less $N_2O$ is formed by Catalyst P (159% Cu, 46% Ag) than by Catalyst K (159% Cu). This is important since $N_2O$ is believed to be a "greenhouse gas" which, like $CO_2$, tends to promote global warming. $N_2O$ is formed by these catalysts at temperatures near the onset of $NO_x$ reduction, about 300° C. to 400° C. The results summarized in Table II-a were obtained using model gas having an air/fuel ratio of 18 with propene as the model hydrocarbon species. 20 ppm $SO_2$ was included in these tests.

TABLE II-a

|  | Integrated $NO_x$ Reduction (%) | Selectivity of $N_2O$ Formation (%) | Total Moles $N_2O$ formed (ppm $N_2O$ min) |
|---|---|---|---|
| Catalyst K (159% Cu) | 57 | 1.7 | 171 |
| Catalyst P (159% Cu, 46% Ag) | 67 | 0.87 | 102 |

The inclusion of $SO_2$ tends to model emission gases from gasoline or diesel-powered engines more realistically than $SO_2$-free gas mixtures or, indisputably, than simple NO/helium mixtures. Catalyst P (159% Cu, 46% Ag) is more effective at reducing $NO_x$ over the temperature range in which nitrous oxide forms. The amount of $NO_x$ reduced in the temperature window (between 300° C. and 400° C.) in which $N_2O$ is formed over the copper/silver catalyst is 10% higher (67% vs. 57%) than over the copper catalyst. As before, the values of $NO_x$ reduction are determined by integration of $NO_x$ conversion vs. time over the relevant temperature span; in this case integrated conversions are stated in terms of percent conversion with respect to the total amount of $NO_x$ that passed through the reactor during the relevant time period. The total number of moles of nitrous oxide formed over the copper/silver catalyst is only 60% that of the copper catalyst. Since more $NO_x$ is reduced, less nitrous oxide formed, the selectivity of nitrous formation over the copper/silver catalyst is only about half that of the copper catalyst. The precise values are listed in Table II-a. Although lower selectivity for nitrous oxide formation is desirable, even more interesting is the observation that a smaller total number of moles of nitrous oxide is produced using the copper/silver catalyst.

EXAMPLE III

This example will demonstrate the effect that the presence of hydrocarbon and water in oxidizing gas streams has on silver's ability to promote copper's capability in copper-silver zeolite catalysts to catalyze reduction of $NO_x$.

Copper-silver zeolite catalysts were prepared using MFI-36 and MFI-38 (ZSM-5 zeolites having Si/Al equal to 18 and 19 respectively). Both catalysts were prepared by the following method: 4.21 g of cupric acetate monohydrate was dissolved in 500 g of deionized water; 3.59 g silver nitrate was dissolved in 500 g of deionized water; and these two solutions were combined. The resulting solution was stirred for forty minutes and then 20 g of MFI powder was added. The mixture was stirred overnight. Concentrated aqueous ammonia was added to raise the pH to 7.5 and the pH of the resulting solution was held constant for two hours. The suspension was subsequently filtered, the zeolite being recovered and calcined in air at 400° C. for 4 hours.

The performance of these catalysts was evaluated according to the procedure of Example I except that catalyst heating proceeded at a rate of 7° C. per minute. In all tests except that labeled "propene/NO=4.7" in FIG. 6 the oxidizing gas stream contained 700 ppmv $NO_x$, 7.5 vol. % $O_2$, 300 ppmv CO, 200 ppmv $SO_2$, 10 vol. % $CO_2$, 10 vol. % $H_2O$ (except for the test labeled "propene/NO=1, no water," in which the gas stream was dry), an amount of propene consistent with the ratios shown on FIGS. 4–6, and the balance $N_2$. For the test labeled "propene/NO=4.7" the gas stream differed only in that it contained 1000 ppmv CO (instead of 300 ppmv), 330 ppm $H_2$, and, of course, 3300 ppmv propene (to yield a propene/NO ratio of 4.7).

Figure 4:
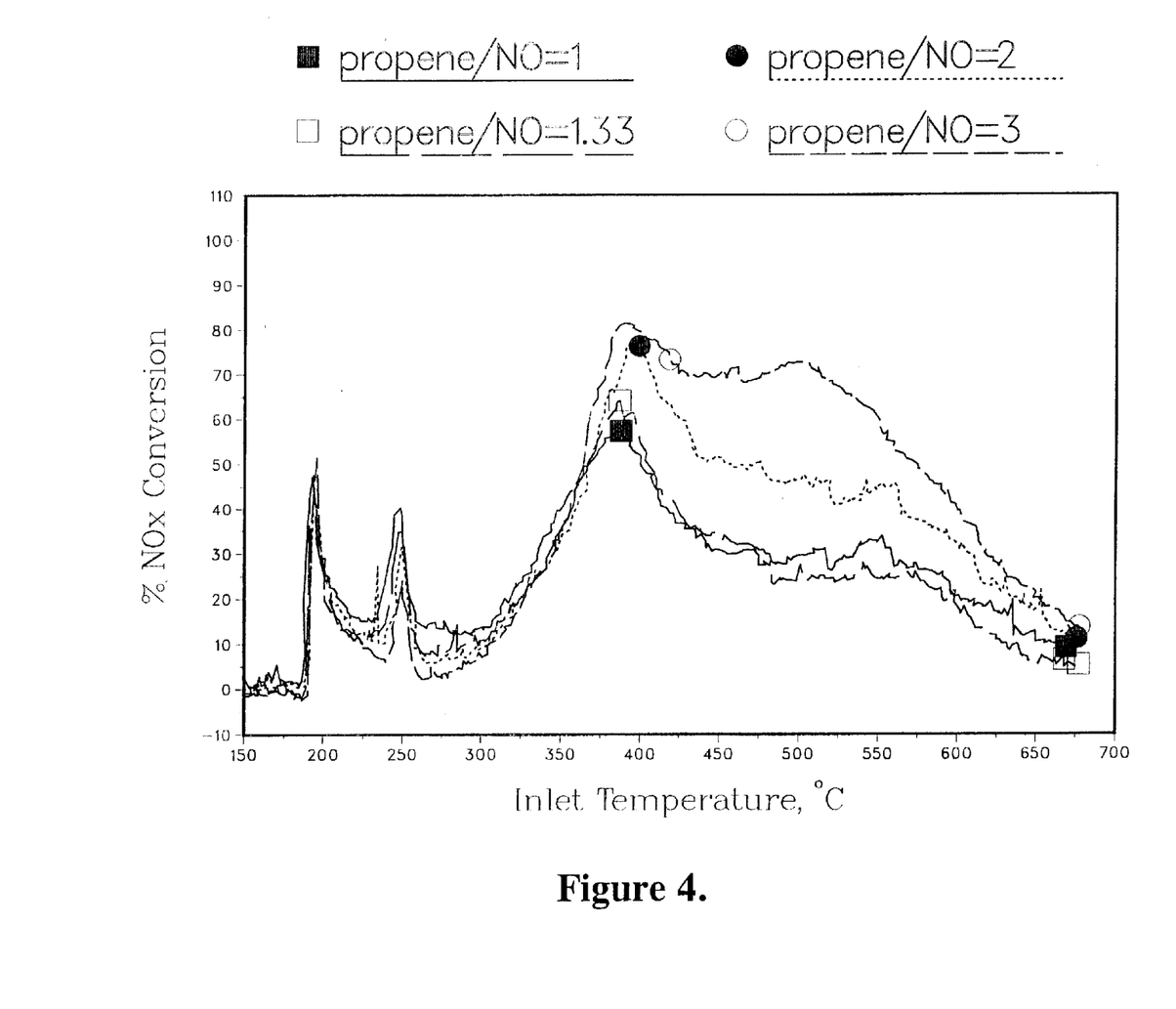
FIG. 4 shows how $NO_x$ reduction improves with increasing propene/$NO_x$ values in the oxidizing gas stream on fresh catalyst.
Figure 5:
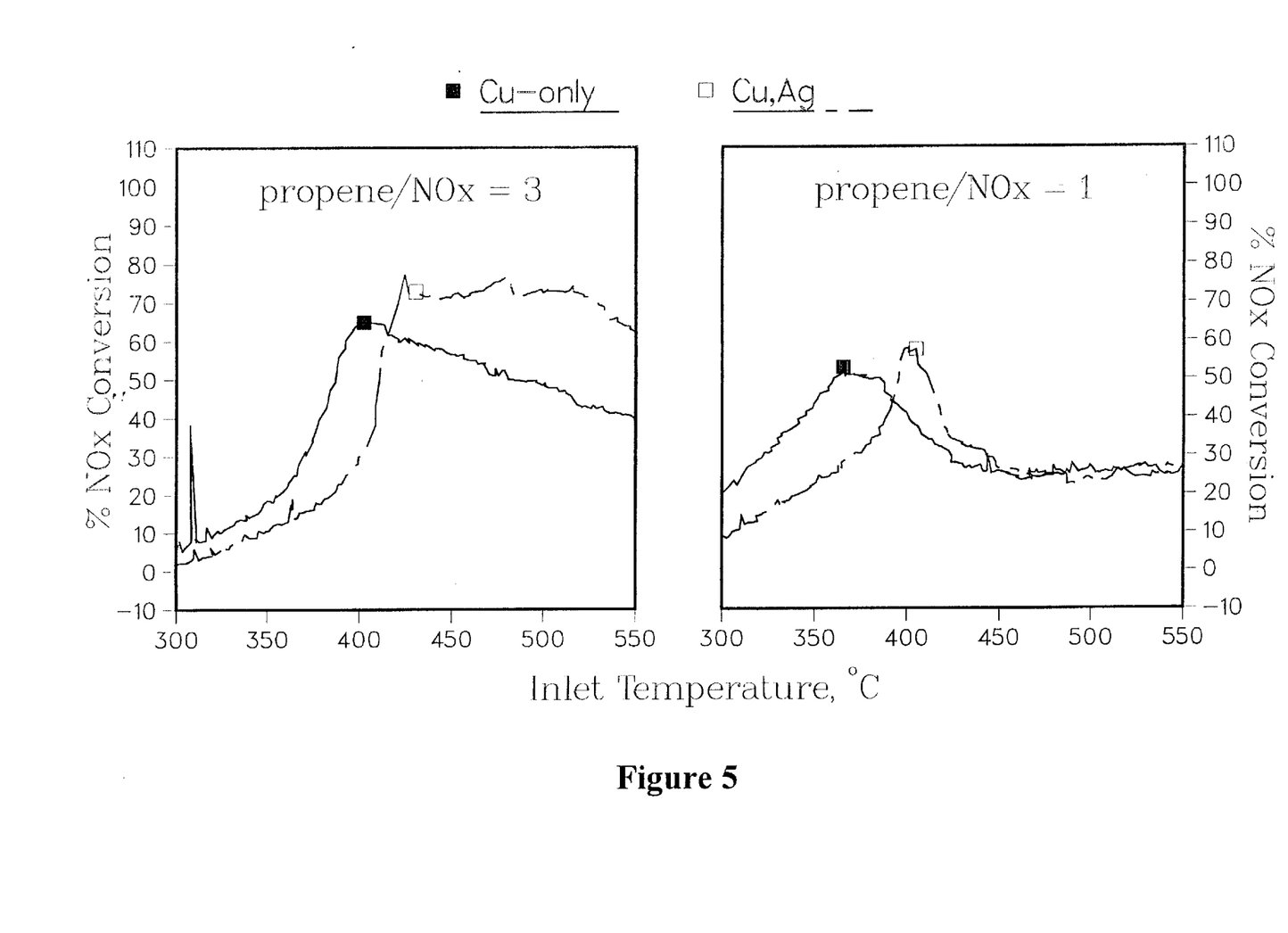
FIG. 5 shows how $NO_x$ reduction improves with increasing propene/$NO_x$ in the oxidizing gas stream on aged catalyst.

FIG. 4 demonstrates the role of increasing the ratio of propene/NO on fresh Cu, Ag-MFI-38. As the propene in the oxidizing gas stream is increased from 700 ppmv to 2100 ppmv conversion of $NO_x$ gradually improves and the shape of the conversion "window" gradually changes. When propene/NO attains 2.7, a plateau of $NO_x$ conversion vs. temperature is achieved. That is, the catalyst maintains 70% $NO_x$ conversion levels from 400° C. to temperatures in excess of 550° C. FIG. 5 shows this same effect of increased propene/NO on $NO_x$ conversion on the same catalyst aged for 1 hour at 700° C. and compares the performance of Cu, Ag-MFI-38 to that of the same catalyst without Ag.

Figure 6:
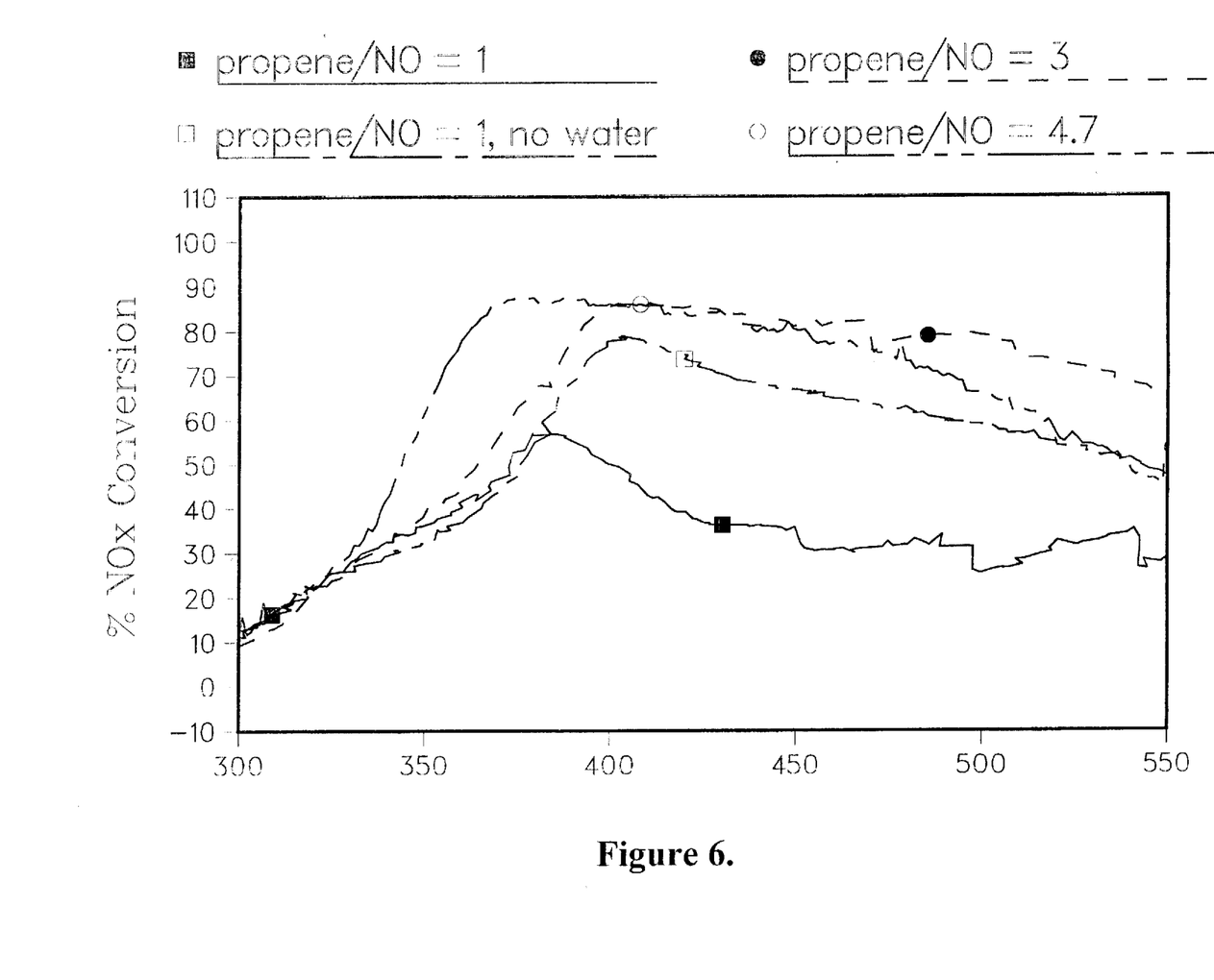
FIG. 6 shows the effect on $NO_x$ reduction of removal of water from the oxidizing gas stream.

FIG. 6 shows the effect of removing water from the oxidizing gas stream on the $NO_x$ conversion capability of Cu, Ag-MFI-36. When water is omitted from the gas stream, $NO_x$ conversion in a gas stream containing propene sufficient to establish a propene/NO ratio of 1 is nearly equivalent to that experienced in a gas stream containing propene/ NO of 3 and 10 vol. % $H_2O$.

EXAMPLE IV

This example will demonstrate another critical zeolite property for the preparation of copper-silver zeolite catalysts having an improved catalytic selective reduction of $NO_x$ relative to copper-only zeolite catalysts.

Copper-only and copper-silver zeolite catalysts were prepared using zeolite ZSM-5 obtained from a source different than the ZSM-5 used in Example II. The catalysts were prepared by the following method except where noted in Table III: Metal salts were dissolved in one liter of deionized water. Twenty grams of ZSM-5 (PQ CBV 8920 Lot ZN-10) were added to the solution. The mixture was stirred overnight. Concentrated aqueous ammonia was added to raise the pH to 7.5.

The suspension was subsequently filtered, the zeolite recovered and calcined in air at 400° C. for 4 hrs. Results for the two catalysts prepared appear in Table III.

TABLE III

| Catalyst | Cu salt (g) | Silver nitrate (g) | Cu ion exch. (%) | Ag ion exch. (%) | Cu/Al | Ag/Al |
|---|---|---|---|---|---|---|
| Q | 3.13[1] | — | 283 | — | 1.42 | — |
| R | 3.32[2] | 2.83 | 283 | 77 | 1.42 | 0.77 |

[1]Cupric acetate hydrate.
[2]Cupric acetate monohydrate.

Figure 7:
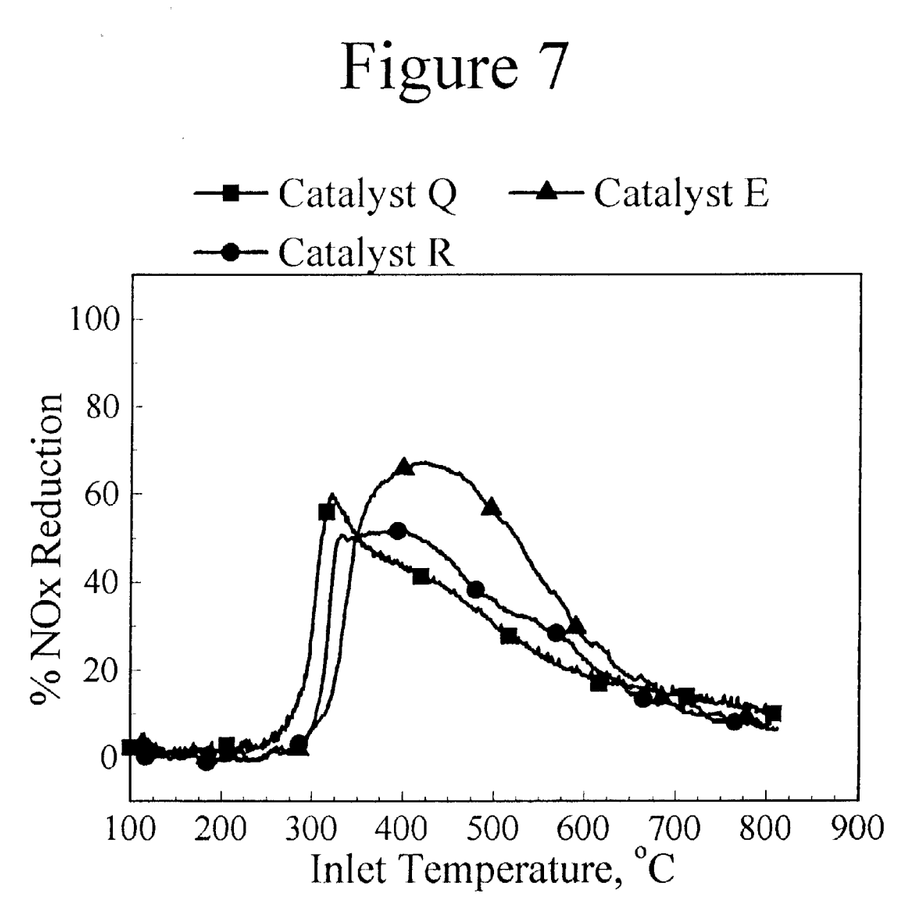
FIG. 7 is a graphic illustration of performance activity of catalysts made with two different zeolites and demonstrating the criticality of the absence of octahedral aluminum in the zeolite.

The performance of these two catalysts was evaluated according to the procedure of Example I. A plot that compares the $NO_x$ conversion versus temperature performance of these two catalysts with Catalyst E (259% Cu, 89% Ag), described in Example I, is shown in FIG. 7. Inspection of FIG. 7 immediately reveals that Catalyst R (283% Cu, 77% Ag) shows no advantage relative to Catalyst Q (283% Cu) and, indeed, is unexpectedly inferior to Catalyst Q. Both of these PQ catalysts are inferior to Catalyst E, which was made with Conteka ZSM-5. The Si/Al atom ratio of the PQ ZSM-5 is 25.6 while the Si/Al ratio of the Conteka ZSM-5 is 25.5. The discrepancy in selective $NO_x$ reduction performance thus cannot be due to the overall Si/Al composition of the zeolite. Characterization of the two zeolites as-received by [27]Al Nuclear Magnetic Resonance (NMR) spectroscopy revealed that the material made by PQ contained some octahedral aluminum while the material made by Conteka contains no octahedral aluminum as detected by NMR spectroscopy. The presence of octahedral aluminum in the PQ material demonstrates that some of the aluminum in this material does not reside at framework sites in the zeolite. Framework aluminum in ZSM-5 occurs at tetrahedral sites and each such aluminum atom corresponds to an exchange site. Consistent with the existence of octahedral aluminum in the PQ material, the PQ material has an ion exchange capacity that is smaller than that of the Conteka material. This was demonstrated as follows:

15 grams of PQ ZSM-5 (PQ CBV 8020, Lot ZN-10) was suspended in one liter of 1 molar sodium nitrate solution and stirred overnight. After filtration and washing (to remove any soluble salts adhering to the solid) a gram of material was removed and submitted for Na and Al analysis by ICP spectroscopy. The rest of the material was re-suspended in one liter of fresh 1 molar sodium nitrate and exchanged overnight for a second time. After filtration, washing, removal of an aliquot of the solid for analysis, the material was exchanged a third time. The results are shown in Table III-a.

TABLE III-a

| Na/Al mole ratio | Time (days) |
| --- | --- |
| 0.55 | 1 |
| 0.62 | 2 |
| 0.61 | 3 |

The results in Table III-a show that a substantial amount of aluminum in this ZSM-5 does not correspond to exchange sites. This is consistent with the NMR spectroscopic results. Dealuminated zeolites are zeolites where only a fraction of the aluminum resides in the zeolite framework at ion exchange sites. Dealuminated zeolites are characterized by lower ion exchange capacities than expected on the theoretical basis of about 1 exchange site per aluminum atom and, in addition, frequently exhibit octahedral aluminum in their $^{27}Al$ NMR spectrum. Evidently, the presence of extra-framework aluminum, exhibited by low sodium ion exchange capacities and by octahedral aluminum in the $^{27}Al$ NMR spectrum detrimentally affects silver promotion of copper for catalytic selective reduction of $NO_x$ by hydrocarbons.

Determination of ion exchange capacity of Conteka ZSM-5: the same procedure as was employed for the PQ ZSM-5 immediately above was applied to 15 grams of Conteka ZSM-5 (CBV 5020, ID $NO_x$ 130-90-002). The analytical results are shown in Table IV.

TABLE IV

| Na/Al mole ratio | Time (days) |
| --- | --- |
| 0.78 | 1 |
| 0.84 | 2 |
| 0.81 | 3 |

Substantially greater amounts of the aluminum in the Conteka material correspond to exchange sites. This is consistent with the apparent absence of octahedral aluminum in the $^{27}Al$ NMR spectrum of the Conteka material. It is concluded that in order for silver to promote copper in the selective reduction of $NO_x$ by hydrocarbons, the zeolite into which copper and silver are to be incorporated must possess essentially no octahedral aluminum detectable by $^{27}Al$ NMR spectroscopy and must possess ion exchange capacities greater than 75%.

I claim:

1. A catalyst for the removal of carbon monoxide, hydrocarbons and nitrogen oxides in an exhaust gas made by a process comprising:

a) preparing a suspension comprising a liquid, a zeolite, a weak base, and salts of copper and silver, said zeolite being crystalline and having a Si/Al atomic ratio between about 5 and about 100, a pore size between about 0.5 nm and about 1.3 nm, essentially no octahedral aluminum detectable by $^{27}Al$ NMR spectroscopy and a sodium ion exchange capacity, with regard to total aluminum content, greater than 75%, and wherein said suspension contains sufficient amounts of said copper and silver salts to result in a copper content in said catalyst, when finished, between about 0.5 wt. % and about 12 wt. %, a silver content between about 0.25 wt. % and about 20 wt. %, an atomic ratio of copper to aluminum greater than 0.5, and an atomic ratio of copper to silver greater than 1.0;

b) adding a sufficient amount of a strong base to raise the pH of the suspension to between about 7 and about 9, thereby creating a metal-containing zeolite support in said suspension;

c) separating the support from said liquid;

d) dispersing said support on a substrate; and e) drying and calcining the product of step (d).

2. The catalyst of claim 1 wherein said zeolite is selected from the group consisting of ZSM-5, ZSM-11, ZSM-12, ZSM-22, ZSM-35, ferrierite, and zeolite beta.

3. The catalyst of claim 1 wherein said weak base is selected from the group consisting of ammonium acetate, ammonium carbonate, ammonium bicarbonate, ammonium oxalate, tetraethylammonium acetate, tetraethylammonium carbonate, and tetraethylammonium oxalate.

4. The catalyst of claim 1 wherein said salts are selected from the group consisting of acetates, nitrates, and carboxylates.

5. The catalyst of claim 1 wherein said copper salt are selected from the group consisting of copper acetate and copper nitrate.

6. The catalyst of claim 1 wherein said silver salt is silver nitrate.

7. The catalyst of claim 1 wherein said copper salt is other than copper acetate and the process comprises the additional step of adding to the suspension of step (a) a silver-colloid-producing reagent selected from the group consisting of soluble acetates and soluble carbonates.

8. The catalyst of claim 1 wherein said strong base is selected from the group consisting of aqueous ammonia and tetraethylammonium hydroxide compounds.

9. The catalyst of claim 1 wherein said process further comprises adding to and thoroughly mixing with the product of step (c) a binder selected from the group consisting of alumina, silica-alumina, titania and zirconia.

10. The catalyst of claim 1 wherein said substrate is selected from the group consisting of pellets, ceramic monoliths, and metallic monoliths.

11. The catalyst of claim 1 wherein said separating the support from the liquid is done by evaporating the liquid and filtering.

12. A catalyst for the removal of carbon monoxide, hydrocarbons, and nitrogen oxides in an oxidizing exhaust gas, including the elements of a crystalline zeolite having a Si/Al atomic ratio of between 5 and 100, a copper content of from about 0.5 wt. % to about 12 wt. %, a silver content of from about 0.25 wt. % to about 20 wt. %, a ratio of copper to aluminum of greater than 0.5 and a ratio of copper to silver of greater than 1.0, wherein the improvement comprises:

f) said catalyst having a pore size in the range of from about 0.5 to about 1.3 nm, essentially no octahedral aluminum detectable by $^{27}Al$ NMR spectroscopy, and a sodium ion exchange capacity, with regard to total aluminum content, of greater than 75%;

g) said copper and silver having been applied to the zeolite simultaneously; and h) said exhaust gas contains hydrocarbons such that the ratio of carbon to $NO_x$ is greater than about 4.5.

13. A catalyst for the removal of carbon monoxide, hydrocarbons, and nitrogen oxides in an oxidizing exhaust gas, including the elements a crystalline zeolite having a Si/Al atomic ratio of between 5 and 100, a copper content of from about 0.5 wt. % to about 12 wt. %, a silver content of from about 0.25 wt. % to about 20 wt. %, a ratio of copper to aluminum of greater than 0.5 and a ratio of copper to silver of greater than 1.0, wherein the improvement comprises:

a) said catalyst having a pore size in the range of from about 0.5 to about 1.3 nm, essentially no octahedral aluminum detectable by $^{27}Al$ NMR spectroscopy, and a sodium ion exchange capacity, with regard to total aluminum content, of greater than 75%;

b) said copper and silver having been applied to the zeolite simultaneously; and c) said exhaust gas contains less than about 0.5 vol. % water.

14. A catalyst for the removal of carbon monoxide, hydrocarbons, and nitrogen oxides in an oxidizing exhaust gas, including the elements a crystalline zeolite having a Si/Al atomic ratio of between 5 and 100, a copper content of from about 0.5 wt. % to about 12 wt. %, a silver content of from about 0.25 wt. % to about 20 wt. %, a ratio of copper to aluminum of greater than 0.5 and a ratio of copper to silver of greater than 1.0, wherein the improvement comprises:

a) said catalyst having a pore size in the range of from about 0.5 to about 1.3 nm, essentially no octahedral aluminum detectable by $^{27}Al$ NMR spectroscopy, and a sodium ion exchange capacity, with regard to total aluminum content, of greater than 75%;

b) said copper and silver having been applied to the zeolite simultaneously; and c) said zeolite is zeolite beta.

* * * * *